US007792093B2

(12) United States Patent
Myhre et al.

(10) Patent No.: US 7,792,093 B2
(45) Date of Patent: Sep. 7, 2010

(54) METHOD, SYSTEM, AND APPARATUS FOR PROVIDING WIRELESS IDENTIFICATION TO STANDARD TELEPHONE

(75) Inventors: John E. Myhre, Shoreline, WA (US); Masud Kibria, Portland, OR (US); James F. Whitehead, Mercer Island, WA (US)

(73) Assignee: AT&T Mobility II, LLC, Atlanta, GA (US)

(*) Notice: Subject to any disclaimer, the term of this patent is extended or adjusted under 35 U.S.C. 154(b) by 1696 days.

(21) Appl. No.: 10/990,105

(22) Filed: Nov. 15, 2004

(65) Prior Publication Data

US 2005/0105512 A1 May 19, 2005

Related U.S. Application Data

(60) Provisional application No. 60/520,073, filed on Nov. 15, 2003.

(51) Int. Cl.
*H04L 12/56* (2006.01)
(52) U.S. Cl. .................. 370/352; 340/572.4; 348/14.01; 370/328; 370/329; 380/247; 455/410; 455/412.1; 455/433; 455/461; 455/558; 713/170; 726/12; 726/28
(58) Field of Classification Search .................. 370/352, 370/356, 401, 402, 389, 466, 328, 329; 455/558, 455/466, 410, 412.1, 433, 461; 340/572.4; 348/14.01; 380/247; 713/170; 726/12, 28
See application file for complete search history.

(56) References Cited

U.S. PATENT DOCUMENTS

| 5,353,328 | A | * | 10/1994 | Jokimies ..................... 455/558 |
| 5,956,636 | A | | 9/1999 | Lipsit |
| 6,014,559 | A | | 1/2000 | Amin |
| 6,035,193 | A | | 3/2000 | Buhrmann et al. |
| 6,223,291 | B1 | * | 4/2001 | Puhl et al. ..................... 726/28 |
| 6,259,691 | B1 | * | 7/2001 | Naudus ..................... 370/352 |
| 6,268,879 | B1 | * | 7/2001 | Sato ........................ 348/14.01 |
| 6,285,869 | B1 | * | 9/2001 | Shannon et al. ............. 455/411 |

(Continued)

FOREIGN PATENT DOCUMENTS

DE          EP0546467    A    *    6/1993

(Continued)

OTHER PUBLICATIONS

B. Willems. International Search Report. Mar. 10, 2005. 3 pages.

*Primary Examiner*—Gerald Gauthier

(57) ABSTRACT

An analog telephone adapter (ATA) having a subscriber identity component in the format of a Subscriber Identity Module (SIM) that couples a telephone to a cellular network via Voice over Internet Protocol (VoIP), thereby allowing a cellular service provider to provide an alternative communication service for the home or business. Instead of using the plain old telephone service, a subscriber can plug their analog telephone into the SIM-enabled ATA (SIM-ATA) and receive telephone service from a cellular service provider, eliminating or reducing the need for a traditional Local Exchange Carrier. The SIM-ATA converts signals from analog to digital, and vice-versa. Once the analog telephone signal has been converted to digital, an IP-based protocol (e.g., VoIP) can be used to transmit the telephone call over a digital network. The cellular service provider can then track usage and bill the subscriber accordingly.

49 Claims, 9 Drawing Sheets

U.S. PATENT DOCUMENTS

| | | | |
|---|---|---|---|
| 6,314,296 B1* | 11/2001 | Hamada et al. | 455/456.2 |
| 6,463,534 B1* | 10/2002 | Geiger et al. | 713/168 |
| 6,650,891 B1* | 11/2003 | Wierzbitzki et al. | 455/414.3 |
| 6,831,561 B2* | 12/2004 | Hahn et al. | 340/572.4 |
| 6,871,063 B1* | 3/2005 | Schiffer | 455/410 |
| 6,888,808 B2* | 5/2005 | Jagadeesan et al. | 370/328 |
| 6,961,323 B1* | 11/2005 | Xu et al. | 370/329 |
| 7,082,319 B2* | 7/2006 | Quentin et al. | 455/558 |
| 7,099,309 B2* | 8/2006 | Davidson | 370/352 |
| 7,145,898 B1* | 12/2006 | Elliott | 370/352 |
| 7,184,428 B1* | 2/2007 | Gerszberg et al. | 370/352 |
| 7,212,520 B2* | 5/2007 | Luciano, III | 370/352 |
| 7,322,041 B2* | 1/2008 | Bilgic et al. | 726/12 |
| 7,353,394 B2* | 4/2008 | Marmigere et al. | 713/170 |
| 7,454,195 B2* | 11/2008 | Lewis et al. | 455/412.1 |
| 7,551,913 B1* | 6/2009 | Chien | 455/411 |
| 7,561,691 B2* | 7/2009 | Blight et al. | 380/247 |
| 7,610,047 B2* | 10/2009 | Hicks et al. | 455/433 |
| 7,657,270 B2* | 2/2010 | Hicks et al. | 455/461 |
| 2003/0152066 A1 | 8/2003 | Luciano, III | |
| 2005/0059430 A1* | 3/2005 | Beeman et al. | 455/558 |
| 2005/0105512 A1* | 5/2005 | Myhre et al. | 370/352 |
| 2006/0105810 A1* | 5/2006 | Gnuschke | 455/558 |
| 2007/0105548 A1* | 5/2007 | Mohan et al. | 455/426.1 |

FOREIGN PATENT DOCUMENTS

EP        0546467 A        6/1993

\* cited by examiner

METHOD, SYSTEM, AND APPARATUS FOR PROVIDING WIRELESS IDENTIFICATION TO STANDARD TELEPHONE

CROSS-REFERENCE TO RELATED APPLICATIONS

This application claims the benefit of U.S. Provisional Patent application Ser. No. 60/520,073 entitled "METHOD, SYSTEM, AND APPARATUS FOR PROVIDING WIRELESS IDENTIFICATION TO STANDARD TELEPHONE" and filed Nov. 15, 2003, the entirety of which is incorporated herein by reference.

TECHNICAL FIELD

This invention relates generally to providing local wireless communications to a subscriber's home and business, and more particularly, relates to providing SIM connectivity to standard telephones.

BACKGROUND OF THE INVENTION

Mobile telephone systems include a variety of services and functions beyond simple direct voice communication. Once scarce and expensive, mobile communication devices are now so common that most people own at least one. Mobile phones allow users to communicate from virtually anywhere. Many mobile phone customers, however, maintain a fixed-line phone at their home, in addition to having a mobile phone.

An inconvenience commonly associated with having a mobile communication device and local phone service is that the subscriber receives service from two different service providers. This typically means that the subscriber receives two bills, one for mobile service and one for service to the home or business.

In some countries, the local exchange carrier (LEC) owns the physical lines, whether copper, coaxial cable, or fiber-optic, that connects homes and businesses to the Public Switched Telephone Network (PSTN). Whether the LEC will share those lines with other service providers is often unclear. In some countries, antitrust laws prohibit mobile service providers from providing local exchange service. In the absence of government regulations, property laws often allow the LEC to prohibit other service providers from using the LEC's lines to provide competitive services. Thus, by government regulation or property law, it is often difficult for communication service providers to compete with a LEC.

One technique used to circumvent this barrier involves the use of an analog telephone adapter (ATA). Utilizing an ATA, consumers can convert their plain old telephone service (POTS) telephone or fax machine into a SIP (Session Initiation Protocol) VoIP telephone to take advantage of Internet telephony services.

SIP is an IETF (Internet Engineering Task Force) protocol for VoIP and, other text and multimedia sessions, e.g., instant messaging, video, online games and other services. SIP is an application-layer control signaling protocol for creating, modifying, and terminating sessions with one or more participants, which sessions include Internet telephone calls, multimedia distribution, and multimedia conferences.

The consumer can simply plug an existing analog telephone into a connector (e.g., an RJ-11 socket) on the ATA, and the ATA provides voice and tone to the POTS telephone. The ATA also includes a network connector (e.g., an RJ-45 jack) that facilitates connection to an Ethernet port for communications over an IP network, e.g., a LAN. Thus, using the ATA it is possible to connect a conventional telephone to a remote VoIP server. The ATA communicates with the remote VoIP server using a VoIP protocol, for example, H.323 (an ITU-T standard that defines call control, channel setup, and CODEC specifications for transmitting voice over, e.g., a packet network), SIP, MGCP (Media Gateway Control Protocol), or IAX (Inter Asterisk eXchange) which provides control and transmission of streaming media over an IP network, and encodes and decodes the voice signal using a voice CODEC. Since an ATA communicates directly with a VoIP server, no software is required to be run on a personal computer.

However, these conventional adapters and systems fall short of allowing wireless service providers to enter the local telephone service market. Thus, there is a substantial unmet need for a system that overcomes the above problems, as well as providing additional benefits.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention affords a relatively easy architecture for wireless providers to enter the local telephone service market by way of an analog telephone adapter (ATA) that employs subscriber identity information stored in the form of, for example, a SIM (Subscriber Identity Module), USIM (Universal SIM), or similar technology, for dial-tone subscription by a wireless provider. The SIM-ATA unit enables analog-digital communications of voice signals between the analog telephone and a cellular provider over an IP network using VoIP (Voice over IP).

The present invention disclosed and claimed herein, in one aspect thereof, comprises an ATA that includes a Subscriber Identity Component (SIC) that works with other circuitry to an analog telephone to a cellular network via an IP network using VoIP. This allows a cellular service provider to provide an alternative communications service for the home or business. Instead of using the plain old telephone service (POTS), a subscriber can plug the analog telephone into the SIC-enabled ATA (SIC-ATA), and the SIC-ATA into an IP network, to receive telephone service from a cellular service provider over the IP network using VoIP, eliminating or reducing the need for a traditional Local Exchange Carrier. When powered up, the SIM facilitates authentication to the wireless provider over the IP network. Once authenticated, the analog telephone voice signals will be converted from analog to digital (and back) for communications with other mobile stations over the IP network.

In another aspect thereof, there is provided a subscriber identity analog telephone system where a single SIC facilitates the use of multiple analog telephones over an IP network to the wireless provider. The subscriber can be identified and billed for services that have been utilized.

In yet another aspect of the invention, there is also provided a router into which the SIC-ATA capabilities can be integrated.

In another aspect of the present invention, the subscriber is a corporation that employs a plurality of analog telephones, the use of which the SIC authenticates a plurality of selected users to use VoIP for analog telephone to cellular communication.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
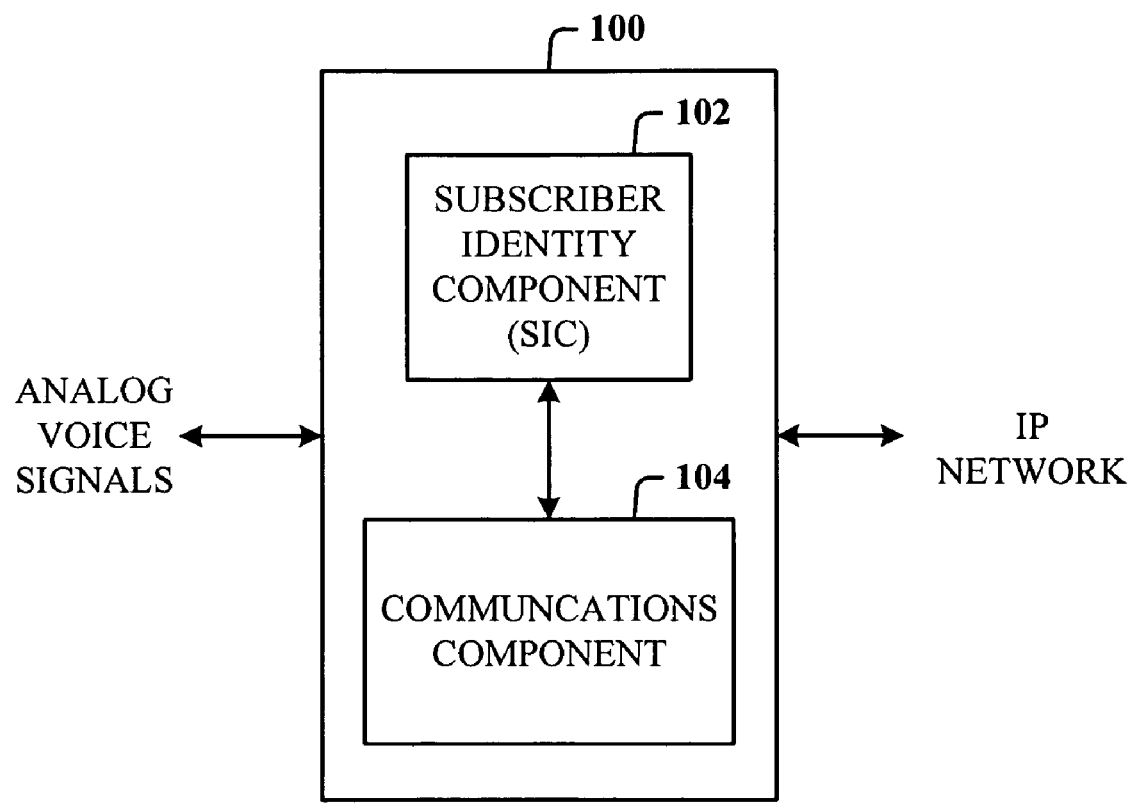
FIG. 1 illustrates a block diagram of an analog telephone adapter (ATA) system in accordance with the subject invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Referring now to the drawings, FIG. 1 illustrates a block diagram of an analog telephone adapter (ATA) system 100 in accordance with the subject invention. The system 100 is used in combination with a conventional analog telephone to facilitate transmitting and receiving calls over a digital IP network, such as with digital cellular systems via the Internet. The system 100 can be provided in the form factor of an adapter that can easily be attached to the analog telephone. It is also contemplated that the system 100 can be modularized for installation in the analog telephone housing such that for a given analog telephone design, the module can be designed to fit within the analog telephone housing.

The system 100 includes a subscriber identity component (SIC) 102 that uniquely identifies a subscriber to a cellular communication network such that the subscriber can be at least identified and billed for services that have been utilized. The SIC 102 can be in the form factor of a subscriber identity module (SIM) that is commonly used in cellular telephones. The SIC 102 can also be a universal SIM (USIM) or similar technology. In any case, there is provided a cellular communications identification technology that facilitates authentication of the user to a cellular network provider.

The system 100 also includes a communications component 104 that interfaces to the SIC 102 and facilitates analog and digital communications. The communications component 104 includes, for example, a CODEC (Coder/Decoder) that provides analog-to-digital conversion of voice signals of a user of the analog telephone, and digital-to-analog conversion of packet data received from an IP network. The CODEC can operate according to a number of specifications, including but not limited to G.711 a-law, G.711 µ-law, G.726, G.729A, and G.723.1. Such data network can be a global communications network such as the Internet, a corporate intranet, and/or managed networks typically used by long and local service traditional providers and ISPs (Internet Service Providers) that use VoIP. The VoIP protocols include, but are not limited to, H.323, SIP (Session Initiation Protocol), MGCP (Media Gateway Control Protocol), and other suitable protocols, for example. In one implementation, the system 100 can also accommodate facsimile transmissions according or a G.711 specification.

The component 104 also includes the interface components for interfacing the system 100 to the analog telephone and the IP network. This can include suitable interface connectors and electronics such as RJ-11 connectors (for the analog telephone) and RJ-45 connectors (for the IP network). It is to be appreciated that other suitable interface equipment can also be used, for example, to support coaxial connections, optical connections, etc. The SIC 102 and component 104 intercommunicate such that when the system 100 is powered up, the subscriber information of the SIC 102 is accessed and communicates over the IP network to the cellular system to uniquely associate the subscriber with the telephone call.

Figure 2:
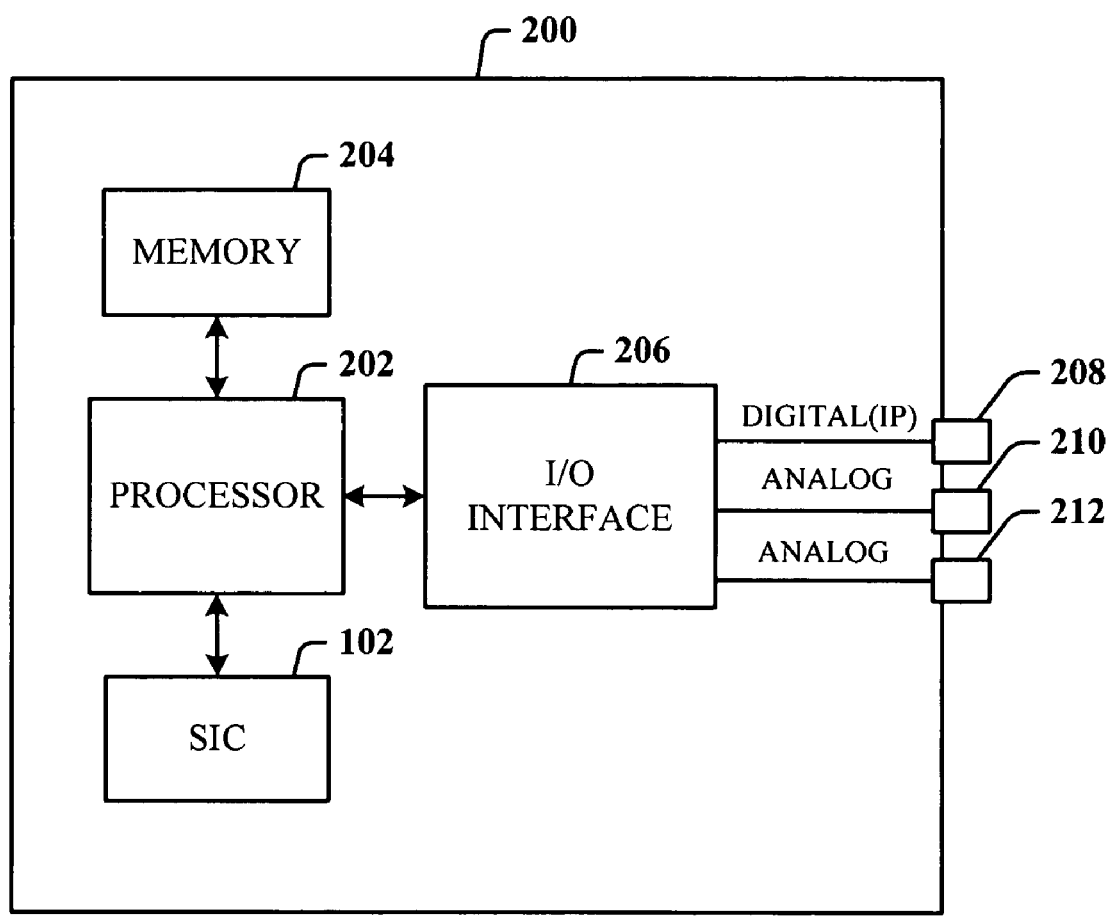
FIG. 2 illustrates a schematic block diagram of a SIC-based ATA system in accordance with the invention.

FIG. 2 illustrates a schematic block diagram of a SIC-based ATA system 200 in accordance with the invention. The invention leverages the existence of SIM or similar technology to facilitate allowing a cellular service provider to provide an alternative communication service for the home and/or business. The system 200 (similar to system 100) can employ the SIC 102 of FIG. 1 in the form of a U/SIM as an embedded or a removable module. The SIC 102 couples to a processor 202 that controls all onboard functions. The processor 202 also couples to memory 204 that stores data and programs, and an input/output (I/O) interface 206 that provides the interface between external connections and the processor 202.

Although the processor 202, memory 204, and I/O interface 206 are shown as separate elements, they do not necessarily need to be. Modern electronic components such as a Digital Signal Processor (DSP), microcontrollers, and Application Specific Integrated Circuits (ASIC) can incorporate some or all of these functions into a single chip. For example, the I/O interface 206 can include a CODEC (coder/decoder) that facilitates the conversion of analog signals to digital signals, and vice versa. Alternatively, the processor 202 can function as the CODEC. In accordance with CODEC capabilities, compression/decompression of signals can also be provided. The I/O interface 206 can also include a transceiver and/or other electronics such as a sample and hold circuit, for example.

The system 200 further includes one or more I/O connectors: a digital port 208, a first analog port 210, and a second analog port 212, all of which can couple to the I/O interface 206. In the embodiment shown, the port 208 can be a single line jack for digital transmission over ordinary copper wire, such as an RJ-45 jack. Connectors 210 and 212 can be single line jacks for analog transmission over ordinary copper phone wire, such as RJ-11 jacks. Either or both of the jacks 210 and 212 can be used to provide power to the system 200. Alternatively, the system 200 can be designed to accommodate batteries that can be charged in situ from power signals received from any of the ports (208, 210 or 212), or removed for replacement.

In operation, when a user chooses to dial out across the IP network using the analog telephone and ATA system 200, the user picks up the telephone handset (goes "off-hook"). In one embodiment, when the handset is off-hook, the SIC 102 is accessed and used to authenticate the user to the cellular network via the IP network. Once authenticated, the user can then initiate the call by dialing a number. The DTMF (Dual Tone Multi-Frequency) signals are processed by the processor 202 for digital transmission over IP network to a telephone system that processes the number accordingly. The call can then be completed to a mobile station of the cellular network. In another implementation, the call can be routed through the IP network to another user on the IP network such that the call is not wireless. Other options and embodiments are described infra, for example, in another embodiment, the user activates the system 200 to initiate VoIP over the IP network.

The system 200 connects to the analog telephone to receive the dial-tone of the telephone line, and send the dial-tone signal to the analog telephone. Thus, any incoming and outgoing signals can be processed by the system 200 to determine signal type (analog versus digital) and signal origin (outgoing versus incoming) to operate in accordance with the invention.

Incoming digital signals from the IP network that arrive at the connector 208, are converted to analog signals, and passed to the analog telephone via either connector 210 or connector 212. In a similar manner, analog signals from the telephone are converted to digital signals and sent to connector 208. Digital signals arriving at the connector 208 of the system 200 travel through the I/O interface 206 to the processor 202. If the digital signals are voice, they are converted to analog signals and sent to either connector 210 or connector 212. The processor 202 can execute programs and access data in the memory 204 to facilitate all onboard processes, and those processes necessary for carrying aspects of the present invention. Analog signals arriving at the connector 210 and/or connector 212 pass through the I/O interface 206 to the processor 202.

In one implementation, the processor 202 can determine if the signals are associated only with an analog call, in which case the analog signals will be processed in a pass-through mode to the analog telephone. In another implementation, when the user chooses to use VoIP, the user can manually activate usage of the IP network (e.g., using a switch) such that the outgoing call will be routed over the IP network (e.g., the Internet). The processor 202 can automatically sense an incoming digital call signal over the IP network and facilitates processing the digital call packets into an analog signal for reception by a user using the analog telephone. In the return path, when the user speaks, analog signals are converted to a digital format by the processor 204 and sent to the connector 208 for VoIP communications over the IP network.

The following relevant documents which describe analog and digital communications, DIGITAL COMMUNICATIONS by John G. Proakis, McGraw-Hill, 1995, and DIGITAL TELEPHONY AND NETWORK INTEGRATION by Bernhard W. Keiser and Eugene Strange, published by Van Nostrand Reinhold, 1995, are both hereby incorporated by reference.

Many cellular systems today comprise a "SIM" card, a "U/SIM" card, or other similar technology, that is used for authenticating cellular subscription, services, billing, and other purposes. Both technologies are denoted collectively and interchangeably hereinafter as either a SIM or a U/SIM. The SIM card is typically in a form factor that is removable by the user, and makes it possible to carry mobile subscription and data through different types and generations of mobile communication devices (e.g., cellular phones). The SIM is typically a smart card that comprises data and program instructions stored in its own onboard memory. The SIM memory is reprogrammable, but can be security locked to prevent unauthorized reprogramming. The SIM can contain at least the subscriber name, subscriber billing information, security credentials, and/or authentication procedures.

The SIM card contains a microchip that houses a microprocessor and a memory. The card stores a mathematical algorithm that encrypts voice and data transmissions, which make it nearly impossible to "listen in" on calls. The SIM also identifies the user to the cellular network as a legitimate caller. The interfaces between the mobile handset and the SIM card are fully standardized, including specifications for third generation handsets and SIMs.

A communications service provider (e.g., cellular provider) can provide the system 200 to subscribing customers. The SIM functionality included in the system 200 allows the communications service provider to bill for IP communications that pass through the system 200. The system 200 can communicate billing information before, during, or after completion of the communication session. In one embodiment, the system 200 communicates billing information at a predetermined interval, along with the number of bytes of information that have passed through the system 200 since the last report. In another embodiment, the system 200 can also bill the user based upon the destination and/or origination addresses of the packets. For example, if VoIP packets from the cellular service provider have a predetermined origination address, then the system 200 can report billing information only for packets that originated from the cellular service provider.

Figure 3:
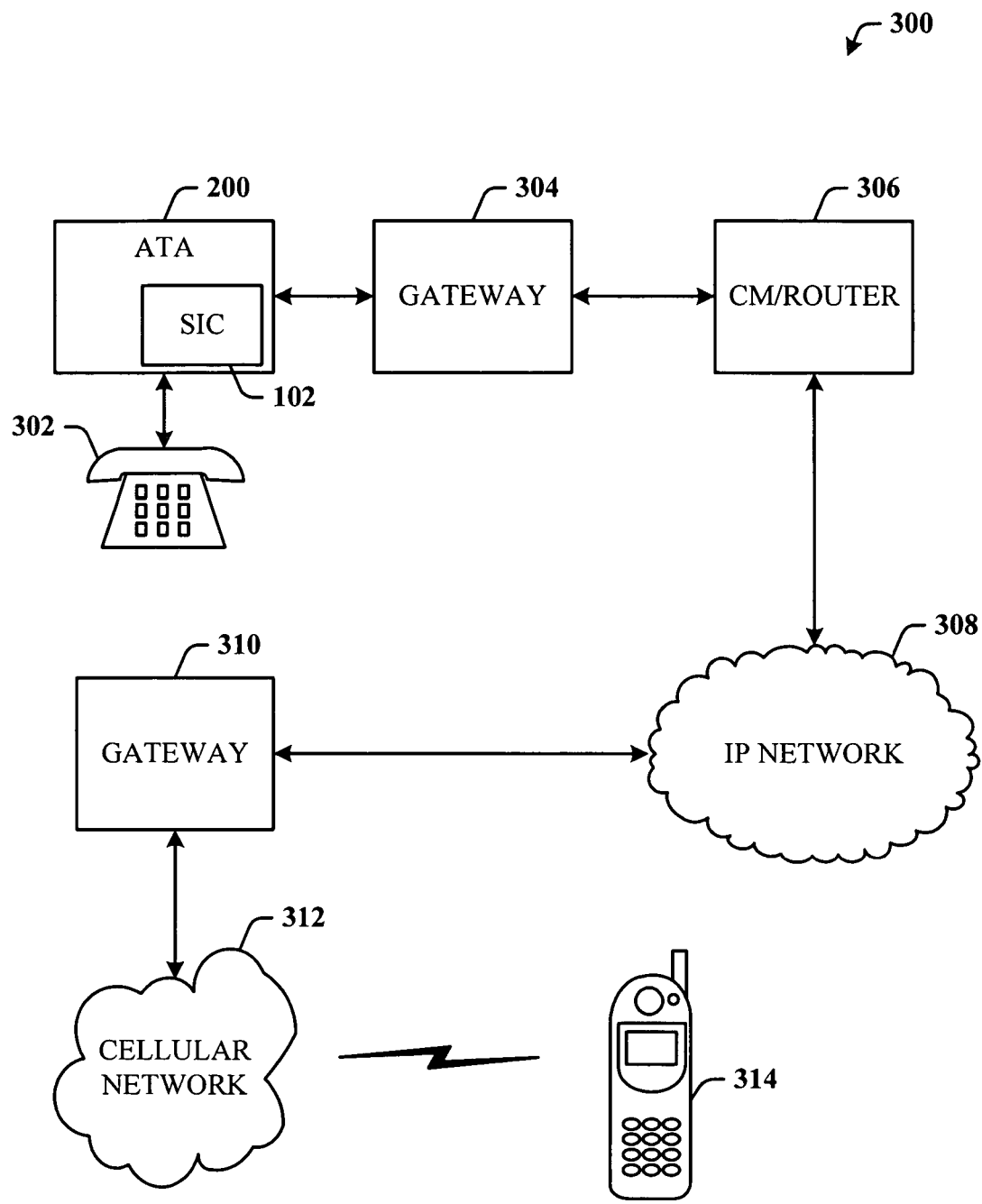
FIG. 3 illustrates a block diagram of a communications system according to one embodiment of the invention.

Referring now to FIG. 3, there is illustrated a block diagram of a communications system 300 according to one embodiment of the invention. The system 300 includes an analog telephone 302 connected to the SIC-ATA system 200 that incorporates the SIC 102 for wireless subscriber identity data. The SIC-ATA 200 outputs IP traffic which includes control plane and barrier plane for voice calls. The SIC-ATA system 200 connects to a gateway 304 which facilitates communications of the IP traffic to a network interface block 306. The gateway 304 facilitates the interface between the home analog telephone network and the IP-based network commonly associated with a LAN, WAN, WWAN, and a global communications network (e.g., the Internet). It is to be appreciated that the SIC-ATA system 200 can be integrated into the gateway 304 to provide combined capabilities in a single unit.

The interface 306 facilitates the interface and IP communications to a network 308, e.g., the Internet. The network interface block 306 can include a cable modem (CM) and/or router system that facilitates communications over a digital broadband network. A second gateway 310 provides the IP network interface to a cellular network 312, and finally to a mobile station 314. The second gateway 310 supports GPRS (General Packet Radio Service), an always-on packet data service for GSM (Global System for Mobile Communications), and other GSM protocols. Of course, the system 300 also accommodates analog(VoIP traffic in the reverse direction, from the mobile station 314 over the network 308 through the SIC-ATA system 200 to the analog telephone 302. Any cellular call to the telephone number associated with the SIC 102 can be routed through the cellular network 312.

Figure 4:
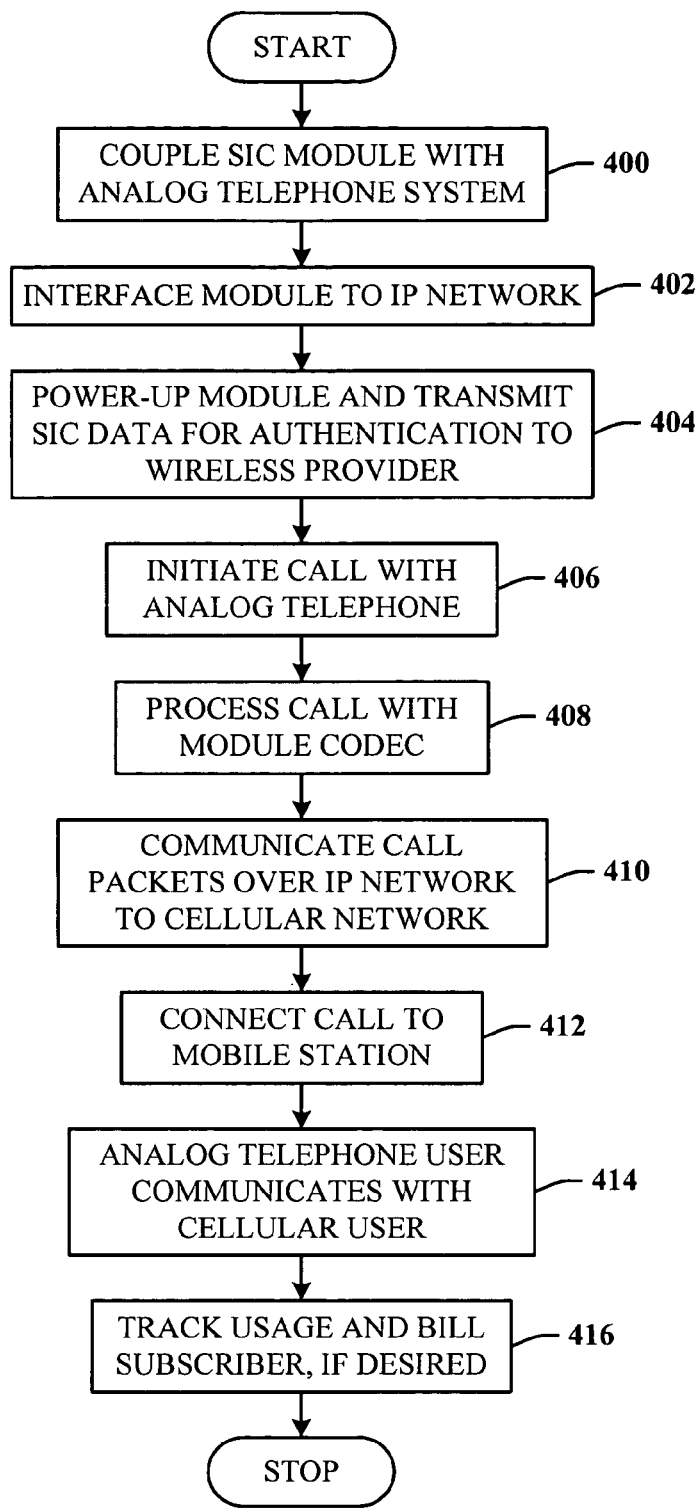
FIG. 4 illustrates a flow chart of a call process in accordance with the present invention.

FIG. 4 illustrates a flow chart of a call process in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 400, the SIC module is coupled to the analog telephone system. At 402, the user connects the module to an IP network, for example, through a gateway and router. At 404, the module is powered up, and subscriber access information communicated over the IP network for authentication of the user to the cellular network. The subscriber access information can be accessed in preparation for tracking and billing the call. At 406, the user initiates a call via the analog telephone by dialing a telephone number. At 408, the call is processed using the CODEC in the module. At 410, the digital call packets are transmitted over the IP network using VoIP or similar technology. At 412, the call is connected to the designated mobile station on the cellular network. At 414, the analog user and wireless user communicate. At 416, if desired, the call can be tracked and billed accordingly. This can include tracking call time information, user IP address, date, etc., all parameters related to the call, and can include routing the call through a server of the cellular provider such that the cellular provider systems monitor all parameters required for tracking, accounting, and billing.

Figure 5:
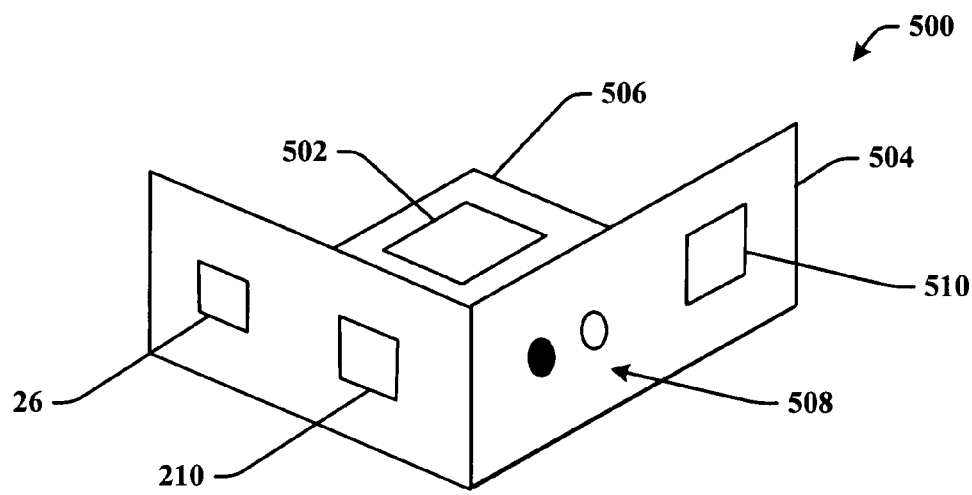
FIG. 5 illustrates an isometric cutaway of a SIM-ATA adapter with SIM capabilities and functionality employed in embedded logic, in accordance with the invention.

Referring now to FIG. 5, there is illustrated an isometric cutaway of a SIM-ATA adapter 500 with SIM capabilities and functionality employed in embedded logic 502, in accordance with the invention. The adapter 500 includes a housing 504 in which a printed circuit (PC) board 506 is mounted. The SIM 502 is mounted on the board 506, along with at least the supporting electronics and connections illustrated in FIG. 2. The housing 504 includes a number of ports, e.g., two ports. The port 208 is single line jack (e.g., RJ-45) for connection to the digital network via a VoIP gateway that facilitates digital transmission over ordinary copper wire. The port 208 can also be configured as a coaxial connector that interfaces to the cable modem.

In another implementation, the port 208 is a USB (or IEEE 1394) connection that interconnects the adapter 500 to the digital IP network. Port 210 is illustrated as an RJ-11 connection for compatibility with the analog telephone. The adapter 500 connects between the incoming LEC line and the analog telephone, such that the telephone receives the line dial-tone through the adapter 500. There can also be provided indicators 508 in the form of low power electronic devices (e.g., LEDs) that provide some indication as to the status of the adapter 500 (e.g., power on, and data traffic). Of course, the location of the ports, indicators, and shape (and size) of the adapter 500 is at the discretion of the designer.

It is to be appreciated that the home subscriber that uses the adapter 500 with embedded SIM capabilities may choose to not use VoIP for an outgoing call. Thus, the adapter 500 further includes a switch 510 that the user activates to bypass VoIP capability, and route the outgoing call over the conventional PSTN (Public Switched Telephone Network) system. In a more robust implementation, the adapter 500 can be configured to interpret a signal sent from the handset of the analog telephone to initiate standard analog calls only. For example, instead of activating the switch 510, the user presses a predetermined DTMF key combination that is processed by the adapter 500 to indicate that the VoIP option is to be bypassed for this outgoing call.

In another alternative implementation, the user need only speak into the analog handset before dialing a number, and voice one or more commands that deactivate (or activate) the VoIP capability. In yet another alternative option, the home subscriber can control the adapter 500 indirectly via the IP network by accessing a website, and deactivating (or activating) the adapter VoIP capabilities. The capability to speak commands, enter key combinations, and manage the adapter via the IP network (e.g., the Internet) provides safeguards where children are involved, for example. Thus, the home subscriber can deactivate (or activate) the VoIP capability or even the analog call capabilities, for that matter, where such a feature is employed. This can be provided as an add-on service by the wireless provider.

Figure 6:
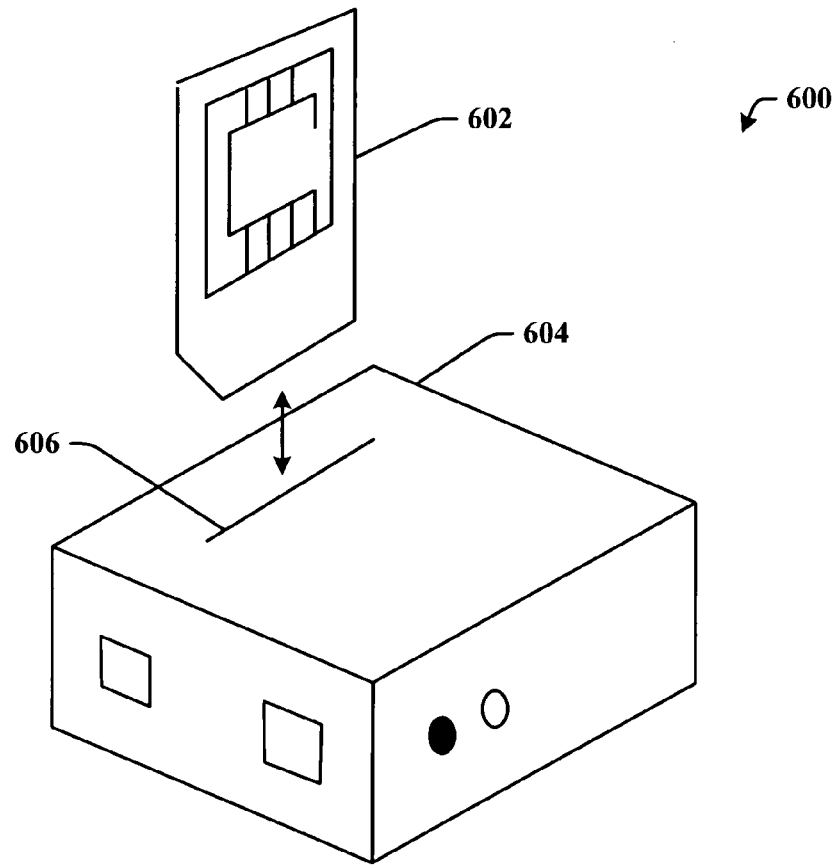
FIG. 6 illustrates an alternative implementation of an adapter that employs a removable SIM in accordance with the present invention.

Referring now to FIG. 6, there is illustrated an alternative implementation of an adapter 600 that employs a removable SIM 602 in accordance with the present invention. The adapter 600 includes a housing 604 with connector ports and indicators similar to those of FIG. 5. The housing 604 further includes a slot 606 that receives the SIM card 602. Mounted on the internal PC board (not shown) is a mating connector (not shown) that receives the SIM 602. Once engaged, the adapter 600 can convert the analog telephone signals for transmission over the Internet by VoIP, and vice versa. Otherwise, with the SIM card 602 removed, the telephone operates normally over analog lines.

With the implementation of FIG. 6, a visitor can simply insert a personal SIM card for use in any home or office system to facilitate analog-to-digital VoIP over the Internet. Since the SIM card 602 is unique to the user, the accounting can be handled as unique to the visitor when using an analog phone system of another subscriber. In support thereof, it is further contemplated that the adapter 600 can include the embedded SIM that is dedicated to the home user, and in this "multi-user" implementation, the accessible slot for the visitor to insert a visitor SIM card. Once the visitor inserts the visitor card, this overrides identification and accounting associated with the embedded SIM associated with the home user (or subscriber). When the visitor subscriber removes the visitor SIM, the adapter 600 operates to default back to accounting for the home subscriber.

Figure 7:
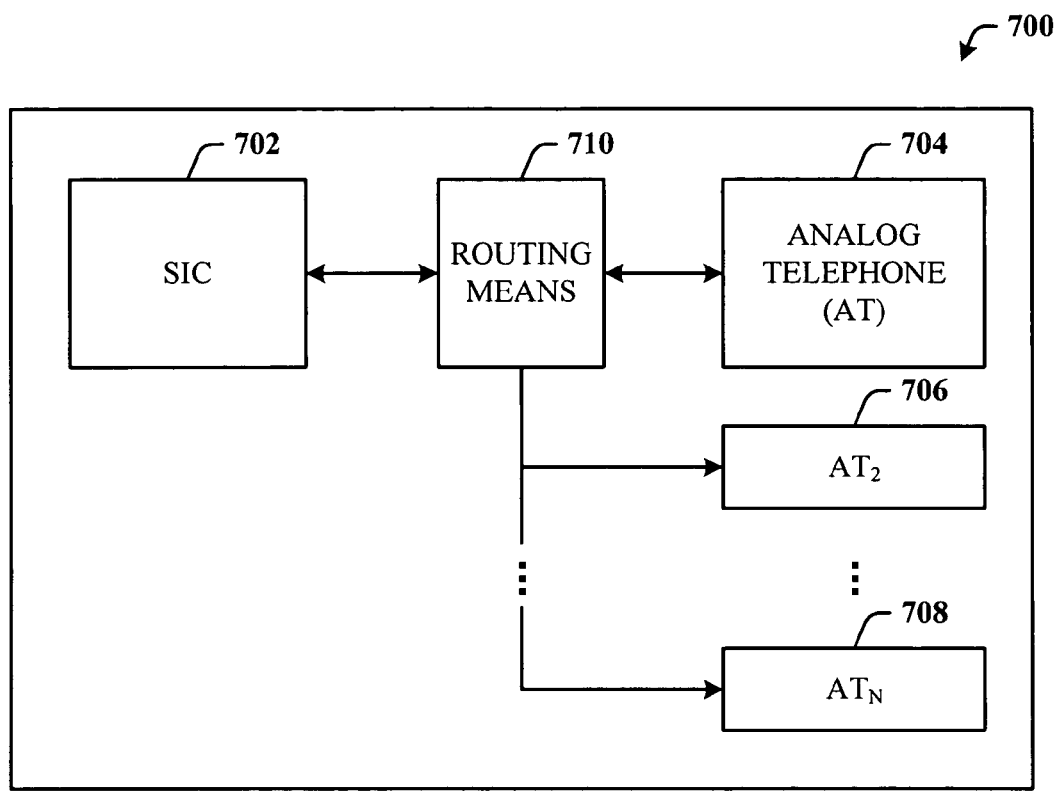
FIG. 7 illustrates a schematic block diagram of a system where a single SIC is employed in a multiple analog telephone environment in accordance with the invention.

FIG. 7 illustrates a schematic block diagram of a system 700 where a single SIC 702 is employed in a multiple analog telephone environment in accordance with the invention. In one embodiment, the system 700 is employed in a subscriber residence where typically only the SIC 702 and one analog telephone 704 are used. However, it is to be appreciated that a location (home and/or business, for example) can have more than one analog telephone connection. In support thereof, the system 700 can further accommodate such implementations by facilitating IP network access to a wireless provider network by multiple users in association with the single SIC 702. Thus, there is provided a second AT 706 (denoted $AT_2$) up to an Nth AT 708 (denoted $AT_N$) that are linked to the SIC 102 by a routing means 710, which can be a switch, or a central processor that routes the subscriber identity information of the SIC 102 to the appropriate AT connection(s), and ultimately, the corresponding provider. The system 700 can be embodied in software and/or hardware.

This particular implementation facilitates using a single SIC 102 to activate multiple analog telephone systems that are interconnected or in the same locale. It is to be appreciated, however, that the SIC 102 can be multiple different SIC devices having different identity information such that if there are six AT devices, for example, there can be six SIC devices employed to facilitates digital communications that are billed according to associated providers.

It is further within contemplation of the present invention that the architecture is not limited to analog telephone devices for the generation of analog voice signals, but can be any device capable of communicating analog signals or analog voice signals. For example, any analog data terminal that is capable of communicating analog signals over the telephone system can be accommodated with the system 700 of the present invention such that the data terminal can now communicate over an IP network and be billed accordingly for telephone system usage.

Note that the SIC-ATA capabilities (e.g., system 100 or system 200) can be integrated into other equipment. For example, the SIC-ATA unit can be integrated into a gateway unit as a single unit with combined capabilities to further facilitate implementation of the subject invention in home and/or business systems that do not have a gateway suitable for such implementation. Moreover, it is further to be appreciated that the SIM-ATA module, gateway, and the router/cable modem can be integrated as a single unit with combined capabilities.

Figure 8:
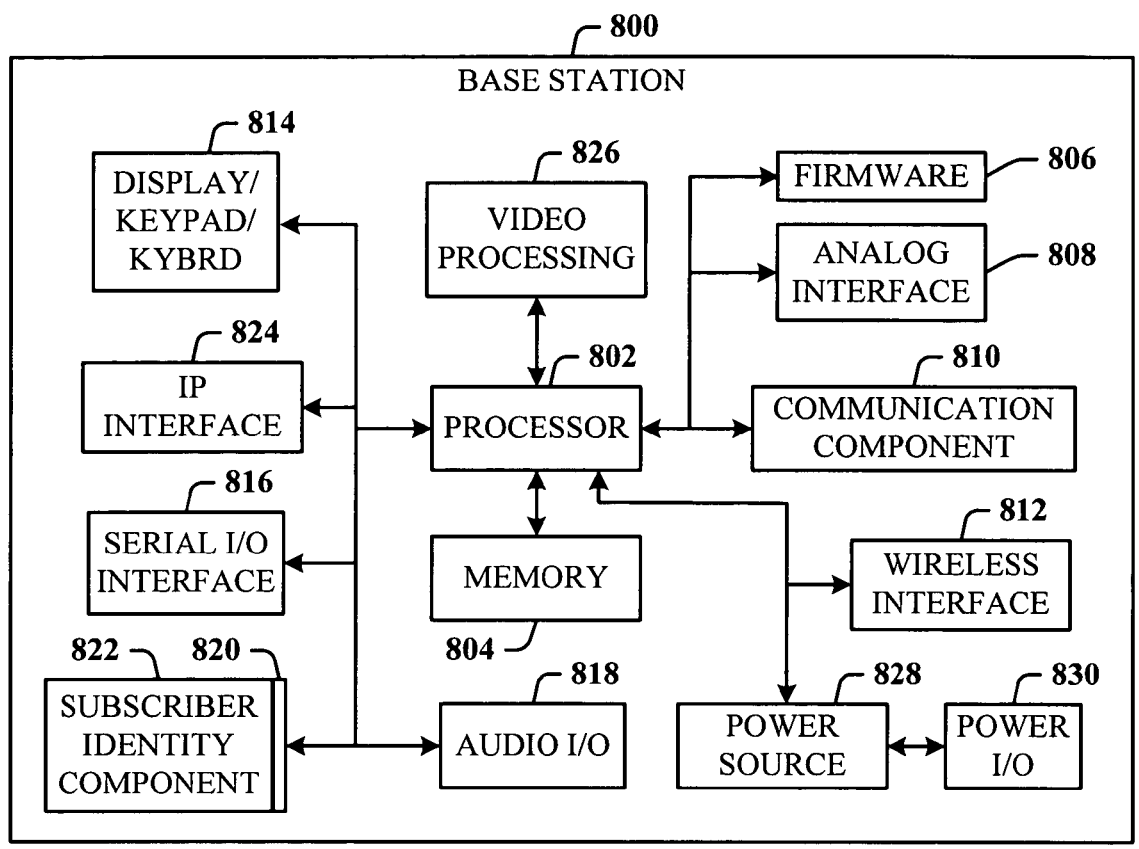
FIG. 8 illustrates a local base station (LBS) that incorporates SIC-ATA capabilities in accordance with the present invention.

Referring now to FIG. 8, there is illustrated a local base station (LBS) 800 that incorporates SIC-ATA capabilities in accordance with the present invention. The LBS 800 includes a processor 802 for controlling and processing all onboard operations and functions. A memory 804 interfaces to the processor 802 for temporary storage of data and one or more applications stored in firmware 806 and being executed by the processor 802. An analog telephone interface 808 accommodates connecting analog telephones and signals to the system 800. The firmware 806 also stores startup code for execution in initializing the LBS 800. A communication component 810 interfaces to the processor 802 to facilitate wired/wireless communication with external systems. Either the processor 802 or the communications component 810, or both, can facilitate CODEC processing for analog-digital signal processing suitable for the subject invention. A second wireless interface 812 can be employed as connected to the processor 802 to accommodate wireless technologies not facilitated by the communication component 810.

The LBS 800 can also include a display/keypad/keyboard component 814 for displaying text and graphics related to telephony functions, for example, a Caller ID function and a setup function, and for user input. The component 814 can also accommodate the presentation of multimedia content. A serial I/O interface 816 is provided in communication with the processor 802 to facilitate serial communication (e.g., USB, and/or IEEE 1394) via a hardwire connection. This supports updating and troubleshooting the LBS 800, for example. Audio capabilities are provided with an audio I/O component 818, which can include a speaker for the output of audio signals related to, for example, recorded data or telephony voice data, and a microphone for inputting voice signals for recording and/or telephone conversations.

The LBS 800 can also include a slot interface 820 for accommodating the SIC in the form factor of a card 822, and interfacing the SIC card 822 to the processor 802. However, it is to be appreciated that the SIC 822 can be manufactured into the LBS 800, and updates made by downloading data thereto. This applies to both the home and corporate embodiments described herein.

The LBS 800 can include an IP interface 824 for accommodating IP traffic from an IP network, for example, the Internet, corporate intranet, home network, person area network, etc., via an ISP or cable provider. Thus, VoIP traffic can be utilized by the LBS 800, and IP-based multimedia content can be received in either an encoded or a decoded format. Where employed, a video processing component 826 can be provided for decoding encoded multimedia content. The LBS 800 also includes a power source 828 in the form of batteries and/or an AC power subsystem, which power source 828 interfaces to an external power system or charging equipment (not shown) via a power I/O component 830.

Figure 9:
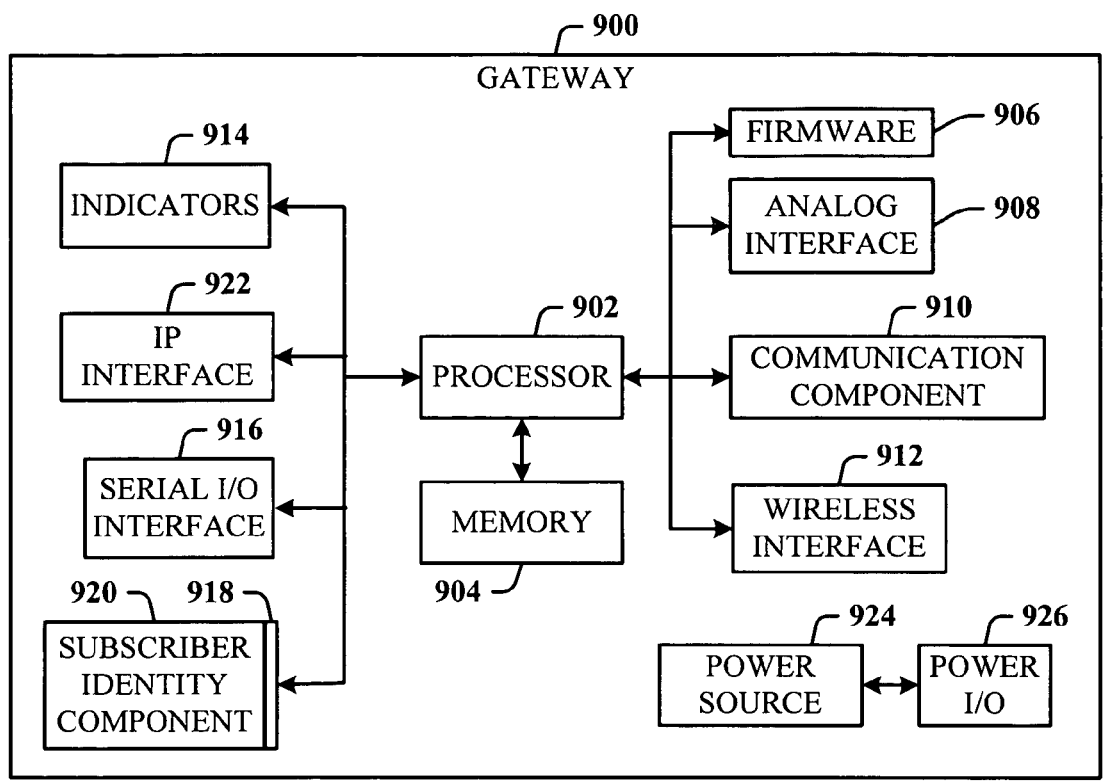
FIG. 9 illustrates a gateway that incorporates SIC-ATA capabilities in accordance with the present invention.

Referring now to FIG. 9, there is illustrated a gateway 900 that incorporates SIC-ATA capabilities in accordance with the present invention. The gateway 900 includes a processor 902 for controlling and processing all onboard operations and functions. A memory 904 interfaces to the processor 902 for temporary storage of data and one or more applications stored in firmware 906 and being executed by the processor 902. An analog telephone interface 908 accommodates connecting analog telephones and signals to the gateway 900. The firmware 906 also stores startup code for execution in initializing the gateway 900. A communications component 910 interfaces to the processor 902 to facilitate wired/wireless communication with external systems. Either the processor 902 or the communications component 910, or both, can facilitate CODEC processing for analog-digital signal processing suitable for the subject invention. A second wireless interface 912 can be employed as connected to the processor 902 to accommodate wireless technologies not facilitated by the communication component 910.

The gateway 900 can also include indicators 914 for providing status information as to processes occurring in the unit, for example, a setup function, power status, and port activity. A serial I/O interface 916 is provided in communication with the processor 902 to facilitate serial communication (e.g., USB, and/or IEEE 1394) via a hardwire connection. This can support updating and troubleshooting the gateway 900, for example. The gateway 900 can also include a slot interface 918 for accommodating the SIC in the form factor of a card 920, and interfacing the SIC card 920 to the processor 902. However, it is to be appreciated that the SIC 920 can be manufactured into the gateway 900, and updates made by downloading data thereto. This applies to both the home and corporate embodiments described herein.

The gateway 900 can include an IP interface 922 for accommodating IP traffic from an IP network, for example, the Internet, corporate intranet, home network, person area network, etc., via an ISP or cable provider. Thus, VoIP traffic can be utilized by the gateway 900, and IP-based multimedia content can be received in either an encoded or a decoded format. The gateway 900 also includes a power source 924 in the form of batteries and/or an AC power subsystem, which power source 924 interfaces to an external power system or charging equipment (not shown) via a power I/O component 926.

Figure 10:
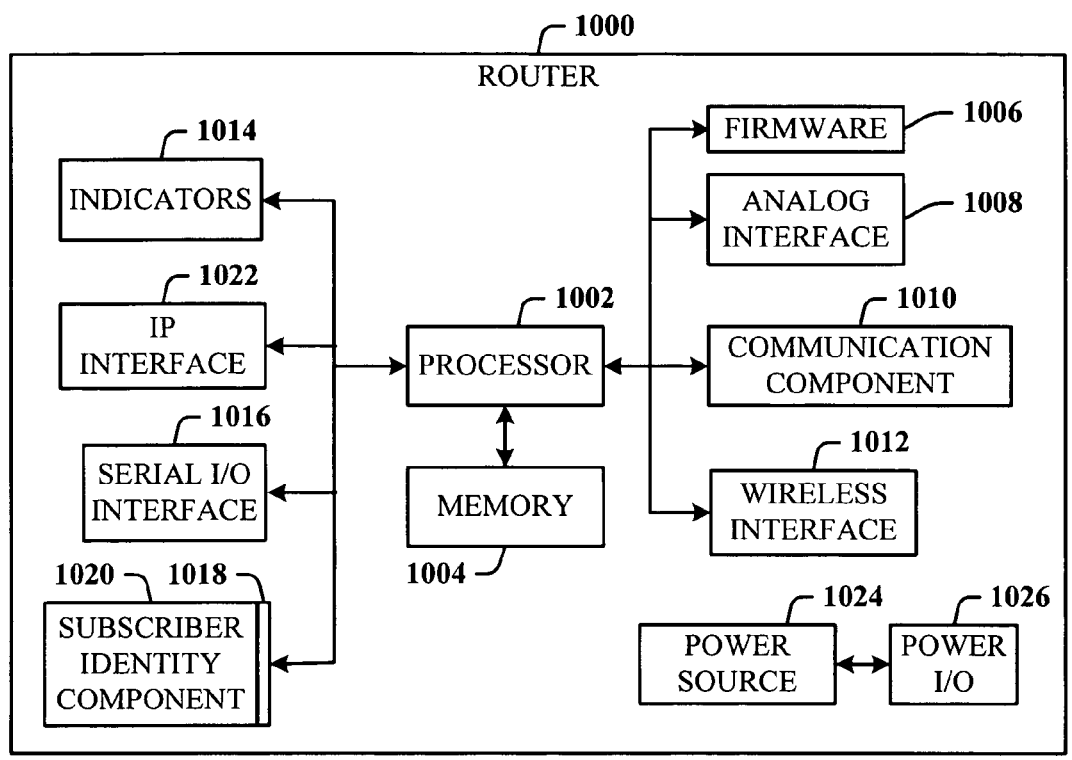
FIG. 10 illustrates a router that incorporates SIC-ATA capabilities in accordance with the present invention.

Referring now to FIG. 10, there is illustrated a router 1000 that incorporates SIC-ATA capabilities in accordance with the present invention. The router 1000 includes a processor 1002 for controlling and processing all onboard operations and functions. A memory 1004 interfaces to the processor 1002 for temporary storage of data and one or more applications stored in firmware 1006 and being executed by the processor 1002. An analog telephone interface 1008 accommodates connecting analog telephones and signals to the gateway 1000. The firmware 1006 also stores startup code for execution in initializing the router 1000. A communications component 1010 interfaces to the processor 1002 to facilitate wired/wireless communication with external systems. Either the processor 1002 or the communications component 1010, or both, can facilitate CODEC processing for analog-digital signal processing suitable for the subject invention. A second wireless interface 1012 can be employed as connected to the processor 1002 to accommodate wireless technologies not facilitated by the communication component 1010.

The router 1000 can also include indicators 1014 for providing status information as to processes occurring in the unit, for example, a setup function, power status, and port activity. A serial I/O interface 1016 is provided in communication with the processor 1002 to facilitate serial communication (e.g., USB, and/or IEEE 13104) via a hardwire connection. This can support updating and troubleshooting the router 1000, for example. The router 1000 can also include a slot interface 1018 for accommodating the SIC in the form factor of a card 1020, and interfacing the SIC card 1020 to the processor 1002. However, it is to be appreciated that the SIC 1020 can be manufactured into the router 1000, and updates made by downloading data thereto. This applies to both the home and corporate embodiments described herein.

The router 1000 can include an IP interface 1022 for accommodating IP traffic from an IP network, for example, the Internet, corporate intranet, home network, person area network, etc., via an ISP or cable provider. The interface 1022 can be multiple IP ports such that the router 1000 includes capabilities as a multi-port hub, switch, or the like. Thus, VoIP traffic can be utilized by the router 1000, and IP-based multimedia content can be received in either an encoded or a decoded format. The router 1000 also includes a power source 1024 in the form of batteries and/or an AC power subsystem, which power source 1024 interfaces to an external power system or charging equipment (not shown) via a power I/O component 1026.

Aspects of the invention described above may be stored or distributed on computer-readable media, including magnetic and optically readable and removable computer discs, as well as distributed electronically over the Internet or over other networks (including wireless networks). Those skilled in the relevant art will recognize that portions or embodiments of the invention may reside in a fixed element of a communication network, while corresponding portions may reside on a mobile communication device. Data structures and transmission of data particular to aspects of the invention are also encompassed within the scope of the invention.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus that facilitates communication of analog signals over a digital network, comprising:
    an analog component that receives the analog signals from an analog telephone and facilitates conversion of the analog signals for communication over the digital network; and
    an identity component that includes subscriber identification information of a subscriber associated with the analog telephone, the subscriber identification information is accessed by the analog component for communication over the digital network to a cellular network.

2. The apparatus of claim 1, wherein the analog component includes at least one of a processor and a CODEC for converting between analog and digital signals.

3. The apparatus of claim 1, wherein the identity component comprises one of a subscriber identity module (SIM) and a universal SIM.

4. The apparatus of claim 1, wherein the subscriber identification information includes at least one of a subscriber name and subscriber account information.

5. The apparatus of claim 1, wherein the analog signals are processed for digital communication via VoIP.

6. The apparatus of claim 1, wherein the network is an IP network.

7. The apparatus of claim 1, wherein the analog component and the identity component are both included as a single module that can be located one of internal to the analog telephone and external to the analog telephone.

8. The apparatus of claim 1, wherein the identity component is associated with a GSM cellular telephone.

9. The apparatus of claim 1, wherein the identity component is provided as one of an embedded component and a removable component.

10. A gateway that includes the apparatus of claim 1.

11. A router that includes the apparatus of claim 1.

12. A local base station that includes the apparatus of claim 1.

13. An apparatus that facilitates communication of analog signals over a digital network, comprising:
    a housing that includes one or more ports;
    an analog component in the housing that receives analog voice signals from an analog telephone and facilitates communication of the analog voice signals over an IP network; and
    a subscriber identification component in the housing that includes subscriber identification information of a subscriber associated with a location of the analog telephone, the analog component accesses the subscriber identification information and communicates the subscriber identification information over the IP network to a cellular provider.

14. The apparatus of claim 13, wherein location is a home of the subscriber.

15. The apparatus of claim 13, wherein subscriber identification component accommodates at least subscriber information of a first subscriber that is embedded in the housing and subscriber information of a second subscriber.

16. The apparatus of claim 13, wherein subscriber information of the second subscriber is provided in the form of a subscriber identity module (SIM) or a universal SIM (USIM) that inserts into the housing.

17. The apparatus of claim 13, wherein the analog component communicates the subscriber identification information to a telephone service provider to associate a call, comprising the analog voice signals, with the subscriber.

18. The apparatus of claim 13, further comprising one or more indicators that indicate a status thereof.

19. The apparatus of claim 13, further comprising an activation button that facilitates manual activation of an operating mode thereof.

20. The apparatus of claim 13, further comprising a switching mechanism that facilitates auto-switching between incoming and outgoing communication modes.

21. A telephone communications system, comprising:
an analog telephone that facilitates the communication of analog voice signals of a subscriber;
an IP network connected to the analog telephone and over which the analog voice signals are communicated; and
an adapter that interfaces the analog telephone to the IP network to facilitate the communication of the voice signals over the IP network via VoIP to a mobile station of a cellular network.

22. The system of claim 21, wherein the IP network includes a digital IP network that accommodates the VoIP traffic.

23. The system of claim 21, wherein the adapter further comprises:
a conversion component that converts between analog and digital signals; and
a subscriber identity component that associates the subscriber with the analog voice signals.

24. The system of claim 21, further comprising a network interface component on the IP network that routes analog voice signals over a circuit-switched network and digital voice signals over a packet-switched network.

25. The system of claim 21, wherein the network interface automatically routes VoIP signals between the IP network and the adapter.

26. The system of claim 21, wherein the adapter automatically processes analog and digital voice signals communicated over the IP network for use by the analog telephone.

27. The system of claim 21, wherein the adapter comprises one of a subscriber identity module (SIM) and a universal SIM that stores subscriber identification information, and which the subscriber identification information is communicated over the IP network to a telephone service provider.

28. The system of claim 21, wherein the IP network interconnects to a cellular network such that the analog telephone communicates the voice signals via the adapter to a digital communications device.

29. The system of claim 21, wherein the cellular network is associated with a cellular telephone provider and the digital communications device is a cellular telephone such that a user of the cellular telephone communicates with the subscriber at the analog telephone over the Internet.

30. A home telephone communication system, comprising:
an analog telephone subsystem that facilitates the communication of voice signals of a call related to a subscriber;
a digital IP network over which the voice signals are communicated, the digital IP network interconnects to a cellular service provider; and
an adapter that interfaces the analog telephone subsystem to the digital IP network to facilitate communication of digitized voice signals over the digital IP network.

31. The system of claim 30, wherein the analog subsystem includes a telephone base station that facilitates at least one of wired and wireless communication with an analog telephone.

32. The system of claim 30, wherein the adapter facilitates authentication of the subscriber before the voice signals can be communicated over the digital IP network.

33. The system of claim 30, wherein the adapter facilitates authentication of the subscriber before the voice signals can be received from the digital IP network.

34. The system of claim 30, wherein the adapter facilitates associating a call, comprising the voice signals, with the subscriber by authentication of the subscriber with a telephone service provider.

35. A method of providing digital communications for an analog telephone subsystem, comprising:
receiving analog voice signals associated with a call of the analog telephone subsystem;
converting the analog voice signals to digital voice signals for communication over a digital IP network;
associating the digital voice signals with subscriber identification information of a subscriber;
authenticating the subscriber to the digital IP network; and
transmitting the digital voice signals over the digital IP network to a wireless caller.

36. The method of claim 35, further comprising:
storing the subscriber identification information in a non-volatile memory device that is associated with the analog telephone; and
accessing the subscriber identification information to authenticate the subscriber to the digital IP network.

37. The method of claim 35, wherein the non-volatile memory device is a subscriber identity module (SIM) or a universal SIM (USIM) device.

38. The method of claim 35, wherein the analog voice signals are processed for digital communication via VoIP.

39. The method of claim 35, the subscriber identification information is associated with a GSM cellular telephone.

40. The method of claim 35, further comprising:
providing a non-volatile memory that stores the subscriber identification;
accessing the non-volatile memory to make the call; and
removing the non-volatile memory when the call is over.

41. The method of claim 40, wherein the non-volatile memory is of a GSM cellular telephone.

42. The method of claim 35, further comprising automatically routing the analog voice signals over one of a circuit switched network and the digital IP network.

43. The method of claim 35, further comprising receiving a cellular call from a cellular telephone to the analog telephone subsystem.

44. The method of claim 35, further comprising overriding the subscriber identification information with visitor identity information such that a visitor can make a call.

45. A system that facilitates digital communications for an analog telephone subsystem, comprising:
means for storing subscriber identification information of a subscriber in a non-volatile memory;
means for interfacing the non-volatile memory to the analog telephone subsystem using a module means;
means for receiving analog voice signals associated with a call of the analog telephone subsystem;

means for converting the analog voice signals to digital voice signals for communication over a digital IP network;

means for accessing the subscriber identification information to authenticate the subscriber to the digital IP network; and means for transmitting the digital voice signals over the digital IP network using VoIP communications.

46. The system of claim 45, further comprising means for associating the subscriber identification information with more than one analog telephone.

47. The system of claim 45, wherein the means for converting comprises converting means that converts the digital voice signals to analog voice signals.

48. The system of claim 45, wherein the module means include means for processing both the analog voice signals and the digital voice signals.

49. The system of claim 45, further comprising routing means for routing an output of the module means to one of a circuit-switched network and a packet-switched IP network.

* * * * *